(12) United States Patent
Raimbault et al.

(10) Patent No.: US 8,473,121 B2
(45) Date of Patent: Jun. 25, 2013

(54) FLY-BY-WIRE CONTROL SYSTEM FOR AN AIRCRAFT COMPRISING DETECTION OF PILOT INDUCED OSCILLATIONS AND A CONTROL FOR SUCH A SYSTEM

(75) Inventors: Nathalie Raimbault, Toulouse (FR); Jean-Pierre Gautier, Toulouse (FR); Alain Sagansan, Colomiers (FR); Pierre Fabre, Toulousse (FR)

(73) Assignee: Airbus Operations SAS, Toulouse (FR)

( * ) Notice: Subject to any disclaimer, the term of this patent is extended or adjusted under 35 U.S.C. 154(b) by 5 days.

(21) Appl. No.: 12/765,713

(22) Filed: Apr. 22, 2010

(65) Prior Publication Data
US 2010/0200701 A1 Aug. 12, 2010

Related U.S. Application Data

(63) Continuation of application No. 10/703,564, filed on Nov. 10, 2003.

(30) Foreign Application Priority Data

Nov. 18, 2002 (FR) ..................... 02 14388

(51) Int. Cl.
  *G01C 23/00* (2006.01)
  *G05D 1/00* (2006.01)
  *G05D 3/00* (2006.01)
  *G06F 7/00* (2006.01)
  *G06F 17/00* (2006.01)

(52) U.S. Cl.
  USPC ....... 701/3; 701/4; 701/12; 701/14; 244/75.1; 244/220; 244/221

(58) Field of Classification Search
  USPC ................. 701/1, 8–12, 14, 3–6; 244/75.1, 244/174, 177, 220, 221, 228, 234; 318/560, 318/561, 565–567, 568.16–568.18, 580, 318/584–586, 597, 611, 612, 614, 616, 617, 318/623, 628; 340/945, 963, 971
  See application file for complete search history.

(56) References Cited

U.S. PATENT DOCUMENTS

| | | | |
|---|---|---|---|
| 3,236,478 A | 2/1966 | Adams | |
| 4,030,011 A * | 6/1977 | Hendrick et al. | 318/561 |
| 4,236,685 A * | 12/1980 | Kissel | 244/223 |
| 4,298,833 A * | 11/1981 | Edwards et al. | 318/561 |
| 4,477,043 A * | 10/1984 | Repperger | 244/223 |
| 4,607,202 A | 8/1986 | Koenig | |
| H703 H * | 11/1989 | Repperger et al. | 244/221 |
| 5,076,517 A | 12/1991 | Ferranti | |
| 5,107,080 A * | 4/1992 | Rosen | 200/6 A |
| 5,125,602 A * | 6/1992 | Vauvelle | 244/223 |
| 5,900,710 A | 5/1999 | Gautier et al. | |
| 5,935,177 A * | 8/1999 | Cox et al. | 701/9 |

(Continued)

OTHER PUBLICATIONS

Preliminary Search Report dated Aug. 7, 2003.

*Primary Examiner* — Thomas H. Tarcza
*Assistant Examiner* — Rami Khatib
(74) *Attorney, Agent, or Firm* — Dickinson Wright PLLC

(57) ABSTRACT

A fly-by-wire control system for an aircraft including detection of pilot induced oscillations and a mobile control unit for such a system. According to the invention, provision is made for the pivotings of the mobile control unit to be damped by a controllable damper controlled by a detector that detects oscillations corresponding to pilot induced oscillations.

8 Claims, 2 Drawing Sheets

U.S. PATENT DOCUMENTS

| | | |
|---|---|---|
| 6,199,028 B1 * | 3/2001 | Repperger et al. ............ 702/189 |
| 6,311,110 B1 * | 10/2001 | Ivers et al. ...................... 701/37 |
| 6,325,331 B1 | 12/2001 | McKeown |
| 2002/0135327 A1 | 9/2002 | Szulyk et al. |
| 2003/0183728 A1 * | 10/2003 | Huynh .......................... 244/224 |
| 2004/0078120 A1 * | 4/2004 | Melkers et al. ................... 701/3 |

* cited by examiner

FLY-BY-WIRE CONTROL SYSTEM FOR AN AIRCRAFT COMPRISING DETECTION OF PILOT INDUCED OSCILLATIONS AND A CONTROL FOR SUCH A SYSTEM

This is a continuation application of application Ser. No. 10/703,564 filed Nov. 10, 2003, which is based on French Application No. 02 14388 filed Nov. 18, 2002, the entire contents of each of which are incorporated by reference herein.

FIELD OF THE INVENTION

The present invention relates to a fly-by-wire control system for an aircraft comprising detection of pilot induced oscillations, and to a control for such a control system.

BACKGROUND OF THE RELATED ART

It is known that the controls (sticks, rudder) of modern aircraft, particularly those known as ministicks, are easy for the pilot and/or the copilot of said aircraft to handle, it being possible for them to be tilted very quickly. By contrast, the actuators operating the moving aerodynamic surfaces of the aircraft (ailerons, flaps, rudders, etc.) operated from these controls cannot respond instantly to the electric commands generated by these controls. There may therefore, at large control amplitudes, be a significant phase shift between the movement of a control and the movement of the moving aerodynamic surfaces it controls.

As a result, the pilot, noticing that the position of the operated mobile aerodynamic surfaces is lagging behind the position chosen for said control member, may attempt to further increase the amplitude by which he tilts said control member. However, the amplitude of turning of the aerodynamic surfaces may then exceed that corresponding to the initial command, which means that the pilot then reduces the tilt of said control member, thus leading, with a delay, to a return of the aerodynamic surfaces, etc. Oscillations, caused by coupling and generally referred to in aeronautical parlance as "pilot induced oscillations" (PIO) therefore occur in the aircraft and may degrade the precision of the flying.

In an attempt at solving this problem, it is known practice to increase the size of the actuators of the aerodynamic surfaces controlled and of their electrical and hydraulic supplies, thus increasing the cost and mass of the aircraft. Such increases in cost and in mass may become intolerable in the case of large-sized aircraft.

Furthermore, document U.S. Pat. No. 4,298,833 envisions the processing of the command, particularly by filtering it, to convert it into an order that is free of pilot induced oscillations. However, this processing is Performed without any true detection of the pilot induced oscillations and without the knowledge of the pilot, who may then continue to generate such oscillations.

SUMMARY OF THE INVENTION

The object of the present invention is to overcome these drawbacks. The invention relates to a fly-by-wire control system and to a control alerting the pilot to the occurence of pilot induced oscillation and acting to avoid its effects.

To this end, according to the invention, the fly-by-wire control system involving electric flight commands for an aircraft, comprising:

a mobile control able to generate at least one electric command for controlling said aircraft about at least one of its axes of maneuver (roll, pitch, yaw); and means for detecting, in said command, any oscillations corresponding to pilot induced oscillations, is notable in that said control comprises controllable damping means able to damp the movements of said control and in that said detection means control said controllable damping means in such a way that these exert on said control an action that opposes the travel of the latter when said detection means detect such oscillations.

Thus, by virtue of the present invention, should pilot induced oscillations occur, said control is braked, which alters the feeling of force felt by the pilot (and therefore alerts the pilot to the presence of such oscillations) and reduces the phase shift between the controlled aerodynamic surface and the control.

The action of said controllable damping means on said control may be of an amplitude that is constant irrespective of the amplitude of said oscillations. However, in the advantageous case where said detection means deliver a detection signal the amplitude of which increases with the amplitude of said oscillations (see, for example, the detector described in the French patent application filed on Nov. 18, 2002, in the name of the Applicant Company, under the number 02 14381), the action of said controllable damping means on said control may advantageously increase in magnitude with the amplitude of said oscillations.

The present invention additionally relates to a mobile control able to generate at least one electric command for controlling an aircraft about at least one of its axes of maneuver, said control being intended for a fly-by-wire control system comprising means for detecting, in said command, any oscillations corresponding to pilot induced oscillations. According to the invention, this control, for example of the stick or rudder type, is notable in that it comprises controllable damping means for said control and in that said controllable damping means are controlled by said detection means in such a way that said controllable damping means exert on said control an action that opposes the rate of travel of the latter when said detection means detect such oscillations.

It will be noted that, in the known way, the controls are already equipped with structural damping means able to avoid excessively rapid flight-control movements. The result of this is that said controllable damping means may be mounted in parallel on said structural damping means.

However, particularly when said oscillation detection means are incorporated into the fly-by-wire computer of said system (see the aforementioned patent application), it is advantageous for said structural damping means and said controllable damping means to be formed of a single controllable damper controlled by said detection means such that:

in the absence of said oscillations, said single damper performs the function of said structural damping means; and in the presence of said oscillations, said single damper performs the function of said controllable damping means.

Said controllable damping means may be of mechanical or hydraulic known type.

However, as a preference, said controllable damping means are formed by a magnetic machine, for example a synchronous machine with a permanent-magnet rotor, operated in a known way to deliver a resistive torque that varies with the rotational speed.

Of course, particularly when it is of the stick type, said control may be able to generate two electric commands for controlling said aircraft about two of its axes of maneuver and be intended for a fly-by-wire control system comprising means for detecting, in each of said commands, any oscillations corresponding to pilot induced oscillations.

In this case, said control comprises controllable damping means controlled by said oscillation detection means and able to act on said control in its movements corresponding to each of said commands.

BRIEF DESCRIPTION OF THE DRAWINGS

The figures of the attached drawing will make it easy to understand how the invention can be embodied. In these figures, identical references denote elements that are similar.

DETAILED DESCRIPTION OF THE INVENTION

Figure 1:
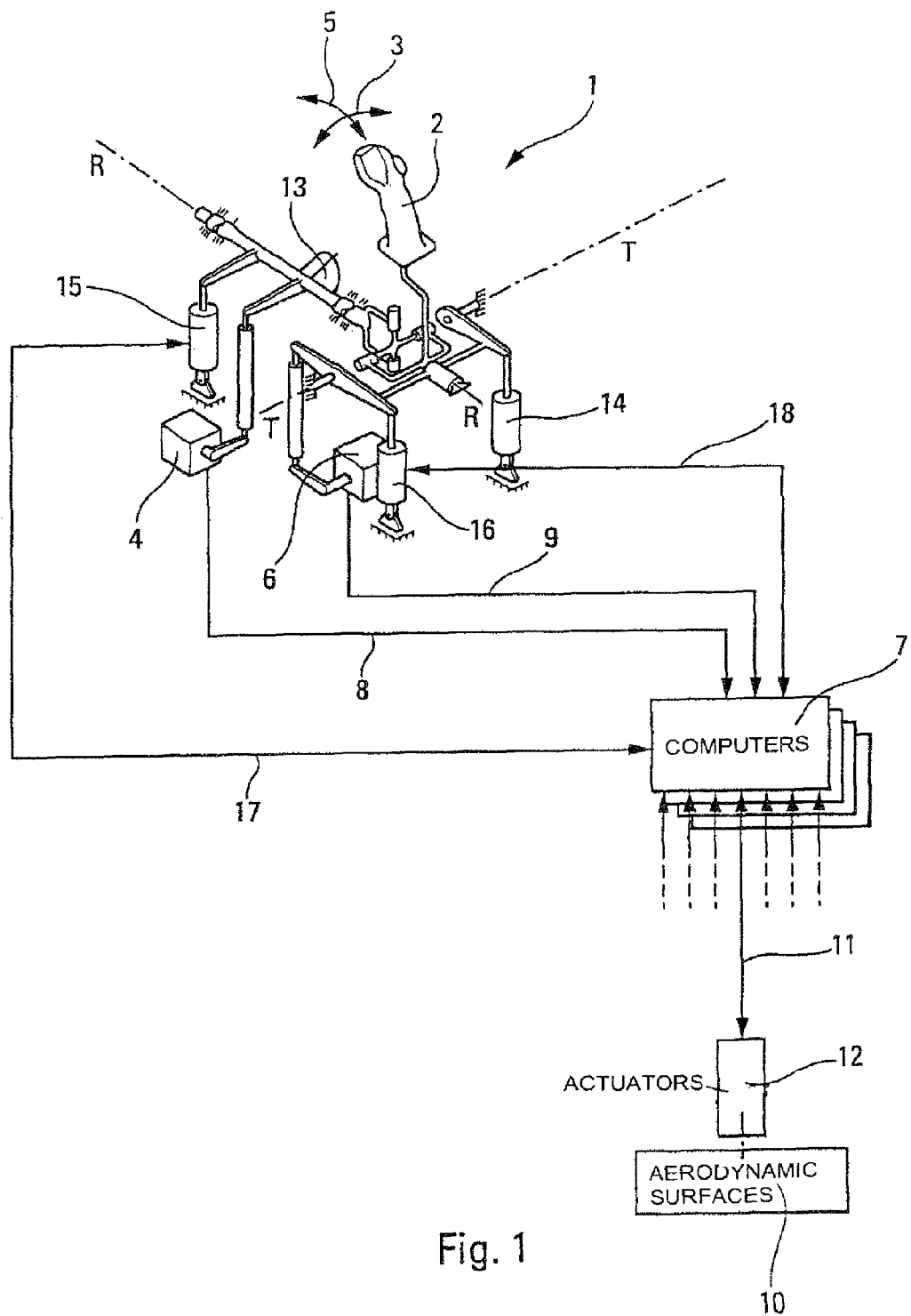
Figure 2:
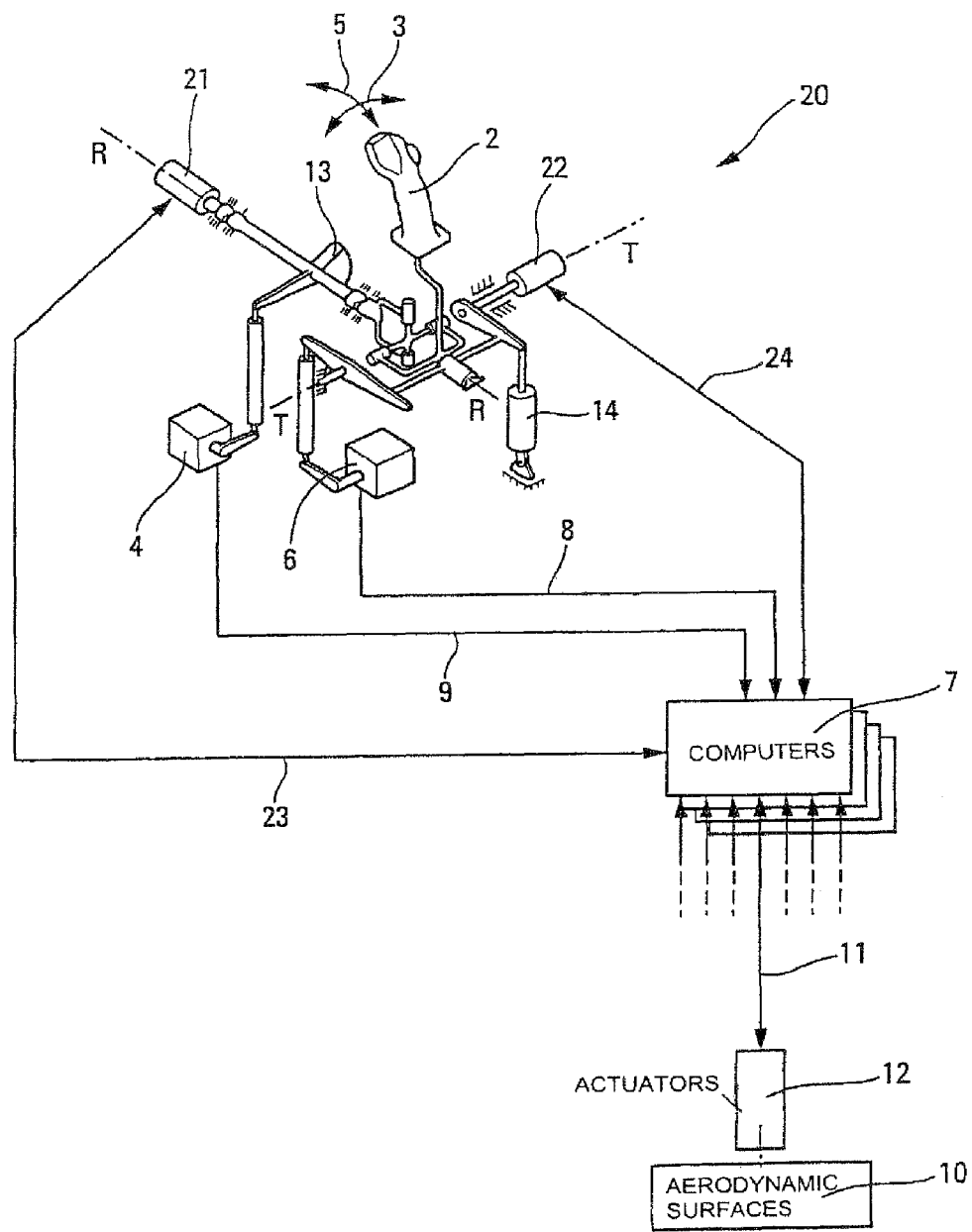

FIGS. 1 and 2 schematically illustrate two embodiments of the present invention.

The fly-by-wire control system for an aircraft, illustrated schematically in FIG. 1, comprises a control stick system 1, able to generate a roll command and a pitch command.

The control stick system 1 comprises a mobile grip 2 which, via a known mechanism, can pivot about a roll-control axis R-R and a pitch-control axis T-T.

The pivoting of the grip 2 about the roll-control axis R-R (double-headed arrow 3) is detected by a sensor 4. Likewise, the pivoting of the grip 2 about the pitch-control axis T-T (double-headed arrow 5) is detected by a sensor 6.

The sensors 4 and 6 generate electric commands for roll and pitch, which correspond to the pivotings of the grip 2 and which are sent to the fly-by-wire computers 7 of said system, via lines 8 and 9 respectively. The computers 7 calculate corresponding turn commands for controlled aerodynamic surfaces (flaps, ailerons, rudders, etc.) 10 of said aircraft (not depicted), and via lines 11, send appropriate electric orders to the actuators 12 of these controlled aerodynamic surfaces 10.

In a known way, artificial sensation devices 13 and 14 providing the pilot with feedback are mounted on the roll-control and pitch-control axes. The device 13 consists for example of a strong scissors mechanism and the device 14 of a strong link rod.

Furthermore, according to an important specific feature of the present invention, the control stick system 1 comprises two dampers 15 and 16, the damping characteristics of which can be modified by an electric order. They are, for example, of mechanical or hydraulic known type. The controllable damper 15 is connected to the roll axis R-R and the controllable damper 16 is connected to the pitch axis T-T to damp the rotation of the grip 2 about these two axes.

In addition, the fly-by-wire computers 7 incorporate means for detecting any oscillations, corresponding to pilot induced oscillations, in the commands originating from the sensors 4 and 6, these detection means being able to deliver, on respective lines 17 and 18 bound for said dampers 15 and 16, orders to modify the damping characteristics of these dampers according to the amplitude of said induced oscillations.

The way in which the system of FIG. 1 works is as follows:

when the pilot (not depicted) actuates the grip 2 by tilting it in such a way that the roll (and/or pitch) command from the sensor 4 (and/or from sensor 6) is free or almost free of pilot induced oscillations, the detection means of the flight computers 7 send the damper 15 (and/or 16), via the line 17 (and/or 18), an electric command setting its damping characteristic to the desired value so that said damper performs its usual function of structural damper of the stick system 1;

by contrast, when the action of the pilot on the tilting grip 2 generates an induced oscillation in the roll (and/or pitch) command originating from the sensor 4 (and/or the sensor 6), the detection means of the flight computers 7 send the damper 15 (and/or the damper 16), via the line 17 (and/or 18), an electric command to harden its damping characteristic, this hardening being either constant, or increasing in magnitude with the amplitude of said oscillations. The pivotings of the grip 2 are therefore then braked.

In the alternative form of embodiment that is FIG. 2, we again see the same elements 2 to 14 as described with reference to FIG. 1. However, in the case of FIG. 2, the control stick system 20 comprises electric dampers 21 and 22 in place of the mechanical or hydraulic dampers 15 and 16. The dampers 21 and 22 are, for example, synchronous machines the rotor of which carries permanent magnets and is wedged on the axis R-R or the axis T-T, respectively.

Thus, the resistive torque exerted by these synchronous machines on said axes can be controlled by electric commands generated by the means for detecting said oscillations belonging to the computers 7 and sent to said dampers 21 and 22 via lines 23 or 24 respectively.

The invention claimed is:

1. A fly-by-wire control system that reduces phase shift between movement of a mobile control and at least one aerodynamic surface of an aircraft, the system comprising:
    a mobile control configured to be operable by a pilot to control movement of the aircraft about at least one control axis of maneuver;
    at least one sensor unit that detects pivoting of the mobile control about the at least one control axis of maneuver and generates electric commands indicative of movement of the mobile control about the at least one control axis of maneuver;
    at least one controllable damper associated with the at least one sensor unit and the at least one control axis that damps the pivoting of the mobile control about the at least one control axis of maneuver; and
    a detector that detects pilot induced oscillation conditions from the electric commands generated by the at least one sensor and sends commands modifying damping characteristics of the at least one controllable damper according to amplitude of said detected pilot induced oscillation conditions, wherein:
    upon the detector detecting a first oscillation condition, the detector sends a first command to the at least one controllable damper setting the damping characteristic according to a predetermined value, and
    upon the detector detecting a second oscillation condition representative of a pilot induced oscillation condition, the detector sends a second command to the at least one controllable damper increasing magnitude of the damping characteristic based on the amplitude of the second oscillation condition.

2. The system of claim 1, wherein the controllable damper is a mechanical or hydraulic damper.

3. The system of claim 1, wherein the controllable damper is a magnetic machine.

4. The system of claim 3, wherein the magnetic machine is a synchronous machine with a permanent-magnet rotor.

5. The system of claim 1, wherein the mobile control is moveable about a roil-control axis and a pitch-control axis.

6. The system of claim 5, further comprising a sensor that detects pivoting of the mobile control about the roll-control axis and a sensor that detects pivoting of the mobile control about the pitch-control axis.

7. The system of claim 6, further comprising a controllable damper that damps movement of the mobile control about the roll-control axis and a controllable damper that damps movement of the mobile control about the pitch-control axis.

8. The system of claim 1, wherein the detector is incorporated into a computer that sends orders to an actuator of the at least one aerodynamic surface based on the damping characteristic commands sent by the detector.

* * * * *